US006864969B1

(12) United States Patent
Börner

(10) Patent No.: US 6,864,969 B1
(45) Date of Patent: Mar. 8, 2005

(54) CALIBRATION SYSTEM FOR CALIBRATING ORIENTATION PARAMETERS OF DIGITAL OPTOELECTRONIC SENSORS IN A MOBILE CARRIER USED FOR REMOTE RECONNAISANCE

(75) Inventor: Anko Börner, Berlin (DE)

(73) Assignee: Deutsches Zentrum Für Luft-und Raumfahrt e.V., Bonn (DE)

( * ) Notice: Subject to any disclaimer, the term of this patent is extended or adjusted under 35 U.S.C. 154(b) by 889 days.

(21) Appl. No.: 09/588,894

(22) Filed: Jun. 7, 2000

(30) Foreign Application Priority Data

Jun. 7, 1999 (DE) .......................... 199 27 012

(51) Int. Cl.[7] .......................... G01C 3/08; G01B 11/26
(52) U.S. Cl. ............................. 356/139.03; 356/4.01; 356/5.11; 356/152.2
(58) Field of Search .................... 356/139.03, 152.2, 356/152.3, 4.01–5.15; 340/967, 974

(56) References Cited

FOREIGN PATENT DOCUMENTS

| DE | 26 38 621 | 3/1977 | |
|---|---|---|---|
| DE | 38 02 219 | 8/1989 | ........... G01C/11/00 |
| DE | 43 14 742 | 11/1994 | .......... G01V/3/165 |

OTHER PUBLICATIONS

Klaus–Peter Schwarz, *Integrated Airborne Navigation Systems for Photogrammetry*, Photogrammetric Week '95, D. Fitsch & D. Hobbie, Eds., Wichmann Verlag, Heidelberg, 1995, pp. 139–153.

Michael Cramer, et al., *Direct Georeferencing Using GPS/Inertial Exterior Orientations for Photogrammetric Applications*, IAPRS, vol. XXXIII, Amsterdam, 2000, Institute for Photogrammetry (ifp) University of Stuttgart, Germany Michael.cramer@ifp.uni–stuttgart.de Working Group III/1.

Cramer & Haala, *Direct Exterior Orientation of Airborne Sensors*, Journal GIM International, Sep. 1999, vol. 13, pp. 46–49.

Mohamed M.R. Mostafa, et al., *Airborne Direct Georeferencing of Frame Imagery: An Error Budget*, The 3rd International Symposium on Mobile Mapping Technology, Cairo, Egypt, Jan. 3–5, 2001.

*Primary Examiner*—Thomas H. Tarcza
*Assistant Examiner*—Isam Alsomiri
(74) *Attorney, Agent, or Firm*—Cohen, Pontani, Lieberman & Pavane

(57) ABSTRACT

A calibration system for ccalibrating orientation parameters of a digital optoelectronic sensor system includes an attitude and position determining system arranged in a mobile carrier, such as an airplane or a satellite, for determining the orientation parameters in flight. An optoelectronic component emits light in a defined direction with respect to the mobile carrier. A planar optical detector is arranged relative to the optoelectronic device for detecting the reflection of radiation emitted from the optoelectronic device and reflected off of a reference module arranged on the ground. The orientation parameters of the reference module are known, wherein the offsets of the orientation parameters of the attitude and position determining system may be determined by evaluating the radiation emitted by the light-emitting component, reflected from the reference module and received by the planar detector.

7 Claims, 1 Drawing Sheet

CALIBRATION SYSTEM FOR CALIBRATING ORIENTATION PARAMETERS OF DIGITAL OPTOELECTRONIC SENSORS IN A MOBILE CARRIER USED FOR REMOTE RECONNAISANCE

BACKGROUND OF THE INVENTION

1. Field of the Invention

The invention relates to a calibration device for calibrating the orientation parameters of digital optoelectronic sensors arranged in a carrier such as a aircraft or a satellite for remote reconnaisance such as photogrammetry.

2. Description of the Related Art

Digital sensors are already playing a significant role in remote sensing today due to their characteristic of recording data in digital form and then transmitting the data to a receiving station. Due to the developments in the field of semiconductor electronics, digital sensor systems will also be capable of advancing within a foreseeable time into the field of traditional photogrammetry and replacing the analog pick-up systems such as, for example, aerial cameras which are based on film.

For the evaluation of the sensor data especially in the case of photogrammetric tasks, considerable importance attaches to the knowledge about the attitude and the position, i.e., orientation parameters, of the pick-up system. It is only if these orientation parameters are known that geometric statements can be made about the observed objects. The accuracy of these so-called orientation parameters determines the quality of the measured geometric variables. In this context, the outer orientation parameters specify the attitude and position of the center of projection of the pick-up system and the inner orientation parameters describe the relationship between the center of projection and the image plane.

The orientation parameters for analog aerial photos are generally determined with the aid of register points, i.e., points on the ground having known locations, during image analysis. The coordinates of these register points are surveyed accurately. The determination of the orientation parameters has been supported in recent years by using GPS and navigation systems.

This traditional approach presents special problems in the determination of the orientation parameters for image data which have been picked up by line scanners. Due to the fact that a rigid image geometry is lacking, the orientation parameters must be redetermined each time an image line is picked up by a line scanner.

A prior art parameter determination method is disclosed, for example, in German reference DE 38 02 219 A1 wherein a series of overlapping individual pictures is made at regular time intervals by an optoelectronic planar pick-up camera allocated to one or more line scanners or a combination of such cameras. The positions of corresponding picture elements or picture zones in the overlapping area of adjacent single planar pictures are in each case selected for the mutual orientation of the pick-up positions of the planar camera. The orientation data of the optoelectronic planar camera is transmitted by permanent alignment or measurement of the relative alignment to the line scanner supported by a time correlation between both data streams. To carry out the method, planar detectors are preferably arranged in the same focal plane between the line scanners.

As the orientation parameters obtained by conventional methods of the photogrammetry always refer to the center of projection, some problems occur during the measuring of these variables. If the position is determined by GPS, the position of the GPS antenna is determined, as a rule. The three angles of rotation are also not measured with respect to the center of projection of the sensor. Moreover, gyroscopic systems only register changes in the angle of velocity, as a rule. To determine an absolute angle, reference angles are necessary at least at one point in time. All six parameters of the outer orientation parameters are thus subject to an offset. These variables are not known and must be determined by additional measurements such as, for example, by theodolites or by evaluating register points. This results in additional expenditure for measurement technology and in additional error sources. Furthermore, this method prevents complete on-board processing.

An arrangement for obtaining highly accurate data from the air is disclosed in German reference DE 43 14 742 A1 which comprises a sensor system having at least non-imaging sensors for determining anomalies of the conductivity and/or disturbances in the earth magnetic field in the area or, respectively, ground to be probed, and a flight guidance system which operates in conjunction with a differential position determining system, the sensor and flight guidance system being arranged in a helicopter. The differential position determining system includes a GPS reference station arranged at a fixed location with known coordinates in the vicinity of the area to be probed. The GPS reference station operates in conjunction with a DGPS transmitter for transmitting position correction data to a DGPS receiver in the helicopter.

A surveying instrument is disclosed in German reference DE 26 38 621. The surveying instrument includes a device for measureing angles such as a theodolite in which the values measured by this device such as the elevation angle or horizontal direction are dependent on leveling errors during the installation. Accordingly, a device for determining leveling errors of the equipment may be permanently connected to the equipment, wherein a computing unit which calculates from the measurement value and leveling error the value of the corrected measured variable, the leveling error being determined by the output signal of a Schottky barrier diode which is mounted rigidly on the equipment and to which a light ray reflected from a liquid surface is applied.

SUMMARY OF THE INVENTION

This invention is therefore based on the technical problem of creating a calibration system for calibrating the orientation parameters of digital optoelectronic sensor systems in mobile carriers (e.g., aircraft or satellites) for remote reconnaissance such as photogrammetry, which enables the offset of the orientation parameters to be determined and processed further on board.

A calibration system for calibrating orientation parameters of a digital optoelectronic sensor system according to an embodiment of the present invention includes an attitude and position determining system arranged in a mobile carrier, such as an airplane or a satellite, for determining orientation parameters during flight. The calibration further includes an optoelectronic component that emits light in a defined direction with respect to the attitude and position determining system arranged in the mobile carrier. A planar optical detector is arranged relative to the optoelectronic device for detecting the reflection of radiation emitted from the optoelectronic device and reflected off of a reference module arranged on the ground. The orientation parameters of the reference module are known. Therefore, the offsets of the orientation parameters of the attitude and position determining system may be determined by evaluating the radiation emitted by the light-emitting component, reflected from the reference module and received by the planar detector. The calibration system comprises at least one attitude and position determining system, at least one light-emitting optoelectronic component, a planar optical detector and a reference module which is arranged on the ground and the orientation parameters of which are known. The radiation transmitted by the light-emitting component is reflected from the reference module and detected by the planar detector. Calculated orientation parameters are computed using the values detected by the planar detector and the known parameters of the reference module. The offset of the orientation parameters determined by the attitude and position determining system are then detected by comparison of the orientation parameters determined by the attitude and position determining system to the calculated orientation parameter values.

In a preferred embodiment, the optoelectronic sensor system is constructed as a charge-coupled device (CCD) line scanner in which planar optical detectors constructed as CCD matrices are arranged between the CCD lines in the same focal plane. As a result of the arrangement, the calibration is evaluated by the evaluation electronics proper of the optoelectronic sensor system which considerably simplifies the configuration.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
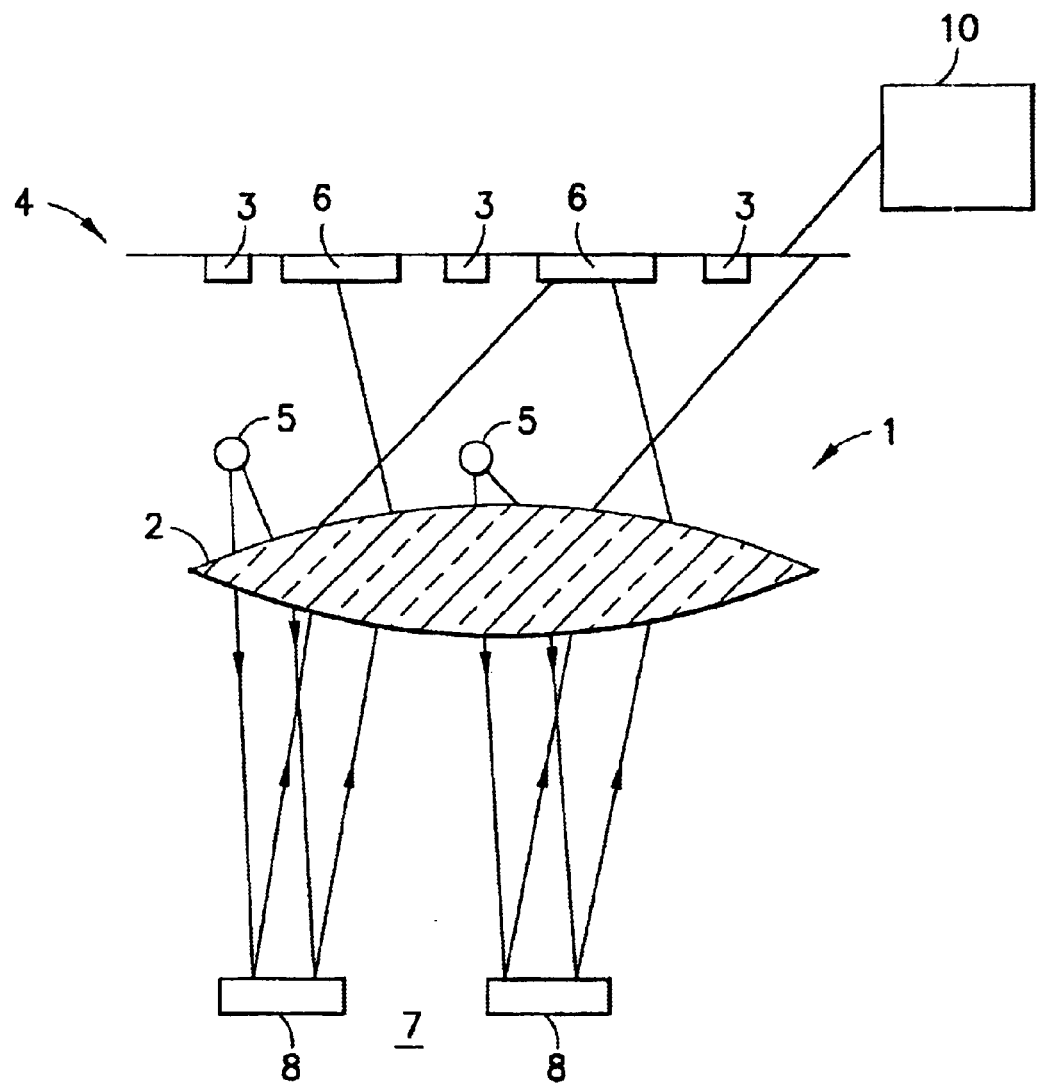
FIG. 1 is a schematic view of an optoelectronic sensor system with an integrated calibration device according to an embodiment of the present invention.

An optoelectronic sensor system 1 comprises an attitude and position determining system 10 and input optics 2 and three charge-coupled device (CCD) lines 3 which are arranged in parallel with one another in a focal plane 4. The attitude and position determining system 10 facilitates determining the exact location of reconnaisance or survey data scanned via the input optics 2 and CCD lines 3. The calibration device comprises two or more laser diodes 5, two or more CCD matrices 6 and a reference module 7 comprising a number of submodules 8. The orientation, i.e., attitude and position, of each submodule 8 of the reference moodule 7 is known with high accuracy. The CCD matrices 6 of the calibration device are arranged between the CCD lines 3 in the focal plane 4. The laser diodes 5 are arranged between the focal plane 4 and the input optics 2 so that they do not interfere with the visual range of the CCD lines 3. The entire calibration device is integrated into the optoelectronic sensor system 1 with the exception of the reference module 7 which is arranged on the ground. The beams of rays from the laser diodes 5 are widened by lenses (not shown), emerge through the input optics 2 and impinge on the reference module 7. The beams of rays are reflected from the reference module 7 and projected on the input optics 2 from where they are imaged onto the focal plane 4 and the CCD matrices 6 arranged thereon. The relative attitude and position of the focal plane 4 with respect to the known orientation of the reference module 7 is then determined from the signal of all CCD matrices 6 in the circuitry of the attitude and position determining system 10. Using the measured attitude and position data, the offset of the attitude and position determining system 10 may then be determined for all six orientation parameters, thus providing an absolute tie-up of the measured variables for the six orientation parameters. The evaluation unit that is required for evaluating data for the CCD lines 3 may also be used for evaluating the data received by the CCD matrices 6 so that the hardware expenditure for incorporating the inventive calibration system into an existing optoelectronic sensor system 1 is essentially restricted to adding the CCD matrices 6 and the laser diodes 5 to the existing system.

If the optoelectronic sensor system 1 is used, for example, for purposes of photogrammetry in an aircraft, the reference module 7 may be set in concrete at a particular position, for example at an airport, so that the reference module 7 is located in an unchangeable defined position and attitude. As a result, the optoelectronic sensor system 1 may be recalibrated before each flight.

The invention is not limited by the embodiments described above which are presented as examples only but can be modified in various ways within the scope of protection defined by the appended patent claims.

I claim:

1. A calibration system for calibrating orientation parameters of a digital optoelectronic sensor system arranged in a mobile carrier for remote reconnaissance, said calibration system comprising:
    an attitude and positioning determining system arranged in the mobile carrier for determining determined orientation parameters of the optoelectronic sensor system during travel of the mobile carrier;
    at least two optoelectronic components, each emitting radiation in a defined direction with respect to the attitude and position determining system;
    a reference module arranged in a known fixed location; and
    a planar optical detector arranged relative to said optoelectronic components for receiving a reflection of the radiation emitted by said optoelectronic components and reflected from said reference module, wherein said attitude and positioning determining system is connected to said planar optical detector and operatively arranged, for calculating calculated orientation parameters using the reflection of the radiation received by said planar optical detector and the known fixed location of said reference module, said attitude and position determining system is further operatively arranged for detecting offsets in the determined orientation parameters by comparing the determined orientation parameters to the calculated orientation parameters.

2. The calibration system of claim 1, wherein each of said optoelectronic components comprises a laser diode.

3. The calibration system of claim 1, wherein said planar optical detector comprises a CCD matrix.

4. The calibration system of claim 1, further comprising a CCD line scanner comprising CCD lines arranged on a focal plane of device optics for obtaining remote reconnaissance data, wherein said planar optical detector is arranged between said CCD lines.

5. The calibration system of claim 4, wherein said optoelectronic components are arranged between said focal plane and said device optics such that they are located outside of a beam path of useful radiation of said CCD lines.

6. The calibration system of claim 5, wherein said planar optical detector comprises a CCD matrix arranged on said focal plane with said CCD lines.

7. The calibration system of claim 1, wherein said reference module comprises a mirror set in concrete.

* * * * *